United States Patent
Allan et al.

(10) Patent No.: US 12,537,817 B2
(45) Date of Patent: Jan. 27, 2026

(54) USING IDENTIFIER AND LOCATOR SEPARATION TO SIMPLIFY APPLICATION NETWORK SERVICE REQUESTS

(71) Applicant: Telefonaktiebolaget LM Ericsson (publ), Stockholm (SE)

(72) Inventors: David Ian Allan, Victoria (CA); Joel Halpern, Leesburg, VA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 170 days.

(21) Appl. No.: 18/704,881

(22) PCT Filed: Nov. 5, 2021

(86) PCT No.: PCT/IB2021/060239
§ 371 (c)(1),
(2) Date: Apr. 25, 2024

(87) PCT Pub. No.: WO2023/079342
PCT Pub. Date: May 11, 2023

(65) Prior Publication Data
US 2024/0422152 A1    Dec. 19, 2024

(51) Int. Cl.
*G06F 7/04*  (2006.01)
*H04L 9/40*  (2022.01)

(52) U.S. Cl.
CPC ................. *H04L 63/083* (2013.01)

(58) Field of Classification Search
CPC .......... H04L 9/0866; H04L 9/3213; H04L 63/0236; H04L 63/0876; H04L 63/1408; H04L 63/083; G06F 21/44
See application file for complete search history.

(56) References Cited

U.S. PATENT DOCUMENTS

2014/0112139 A1*  4/2014  Allan ............... H04L 47/125
                                                370/235
2014/0328300 A1   11/2014  Luo et al.
(Continued)

FOREIGN PATENT DOCUMENTS

WO       2021/197835 A1    10/2021

OTHER PUBLICATIONS

Kafle et al, Generic Identifiers for ID/Locator Split Internetworking, May 13, 2008, IEEE, pp. 1-8. (Year: 2008).*
(Continued)

*Primary Examiner* — Philip J Chea
*Assistant Examiner* — Jenise E Jackson
(74) *Attorney, Agent, or Firm* — Nicholson, De Vos, Webster & Elliott, LLP

(57) ABSTRACT

An embodiment is a method by one or more network devices implementing a network token generator in a network. The method includes receiving a request from an end node to apply a network service to network traffic originated by the end node, wherein the end node implements an identifier-locator separation network protocol and is associated with an identifier and a locator in accordance with the identifier-locator separation network protocol, generating a network token based on the identifier associated with the end node but not based on the locator associated with the end node in response to receiving the request, associating the network token with the network service, and sending the network token to the end node.

17 Claims, 8 Drawing Sheets

(56) References Cited

U.S. PATENT DOCUMENTS

2020/0177629 A1* 6/2020 Hooda ............... H04L 47/746
2020/0245206 A1* 7/2020 Allan ................. H04L 45/04
2022/0272117 A1* 8/2022 Maheve ............. H04L 63/1416

OTHER PUBLICATIONS

Durresi et al, Tokens for Anonymous Communications in the Internet, Sep. 8, 2006, IEEE, pp. 1-5. (Year: 2006).*
RFC 6740: Atkinson, et al., "Identifier-Locator Network Protocol (ILNP) Architectural Description," IETF Trust, Internet Research Task Force, Request for Comments: 6740, Nov. 10, 2012, pp. 1-53.
RFC 6830: Farinacci, et al., "The Locator/ID Separation Protocol (LISP)," IETF Trust, Internet Research Task Force, Request for Comments: 6830, Jan. 2013, pp. 1-75.
RFC 6830: Fuller, et al., "Locator/ID Separation Protocol (LISP) Map-Server Interface," IETF Trust, Internet Engineering Task Force, Request for Comments: 6833, Jan. 2013, pp. 1-13.
Tu Rui et al: Network "Network Access Control Mechanism Based on Locator/Identifier Split", IEEE International Conference on Networking, Architecture, and Storage, Nas 2009, Piscataway, NJ, USA, Jul. 9, 2009, pp. 171-174.

* cited by examiner

USING IDENTIFIER AND LOCATOR SEPARATION TO SIMPLIFY APPLICATION NETWORK SERVICE REQUESTS

CROSS-REFERENCE TO RELATED APPLICATIONS

This application is a National stage of International Application No. PCT/IB2021/060239, filed Nov. 5, 2021, which is hereby incorporated by reference.

TECHNICAL FIELD

Embodiments of the invention relate to the field of communication networks, and more specifically to providing network services in a network using network tokens.

BACKGROUND

The current namespace architecture used by the Internet Protocol (IP) layer uses IP addresses for two different functions: (1) as an endpoint identifier; and (2) as a locator for routing purposes. Using IP addresses for these two different functions does not allow the network to scale well, particularly when there is multihoming and/or end node mobility involved. To address this problem, network protocols have been proposed that create a separation between the identifier and the locator. Examples of such network protocols include Identifier/Locator Network Protocol (ILNP) and Locator/Identifier Separation Protocol (LISP).

A "network token" scheme may be used to allow an end node to make a request to the network to apply certain network services to its packets. The general idea behind such a scheme is that when an end node (e.g., a user equipment (UE)) wishes to send data packets with special requirements (e.g., latency bounds, latency variation bounds, and/or bandwidth requirements), the end node sends a request to a known entity of the network. The entity may be known based on the use of Dynamic Host Control Protocol (DHCP), configuration, as an artifact of registration with the network, or the use of a service discovery mechanism. The request may include information regarding the network service being requested, the set of packets to which the network service shall be applied, and the user who is requesting the network service. It may also include information that allows the network to determine whether there is a business reason to justify granting the request. If the network entity determines that the request should be granted, the entity may generate and send a cryptographically signed bitstring to the end node that the end node can then include as metadata in its packets. When a given network node receives a packet originated by the end node that includes the cryptographically signed bitstring, the network may apply the network service associated with that cryptographically signed bitstring to the packet if the network is able to verify that the cryptographically signed bitstring is valid. The end node may thus use the cryptographically signed bitstring as a "token" to receive a particular network service while being arbitrarily routed thought the network.

There are several approaches to implement the network token scheme. The first and simplest approach is to include the network token in every packet. A drawback of this approach is that it significantly increases the size of packets and requires that cryptographic information be processed for every packet. Another approach is to only include the network token in some of the packets. For example, the network token may be included in the initial packet, and then intermittently in subsequent packets, as needed (e.g., when circumstances have changed). This requires that the network token properly identify which set of packets is being authorized for the network service so that packets that do not include the network token can be processed properly. Currently, this may be achieved by tying the network token to a 5-tuple of source IP address, destination IP address, source port number, destination port number, and the protocol name.

SUMMARY

An embodiment is a method by one or more network devices implementing a network token generator in a network. The method includes receiving a request from an end node to apply a network service to network traffic originated by the end node, wherein the end node implements an identifier-locator separation network protocol and is associated with an identifier and a locator in accordance with the identifier-locator separation network protocol, generating a network token based on the identifier associated with the end node but not based on the locator associated with the end node in response to receiving the request, associating the network token with the network service, and sending the network token to the end node.

An embodiment is a set of non-transitory machine-readable media having computer code stored therein, which when executed by a set of one or more processors of one or more network devices implementing a network token generator, causes the network token generator to perform operations including receiving a request from an end node to apply a network service to network traffic originated by the end node, wherein the end node implements an identifier-locator separation network protocol and is associated with an identifier and a locator in accordance with the identifier-locator separation network protocol, generating a network token based on the identifier associated with the end node but not based on the locator associated with the end node in response to receiving the request, associating the network token with the network service, and sending the network token to the end node.

An embodiment is a network device to implement a network token generator in a network. The network device includes one or more processors and a non-transitory machine-readable medium. The non-transitory machine-readable medium has computer code stored therein, which when executed by the one or more processors, causes the network token generator to receive a request from an end node to apply a network service to network traffic originated by the end node, wherein the end node implements an identifier-locator separation network protocol and is associated with an identifier and a locator in accordance with the identifier-locator separation network protocol, generate a network token based on the identifier associated with the end node but not based on the locator associated with the end node in response to receiving the request, associate the network token with the network service, and send the network token to the end node.

An embodiment is a method by one or more network devices implementing a network token verifier in a network. The method includes receiving network traffic originated by an end node that implements an identifier-locator separation network protocol, wherein the network traffic includes an identifier and locator associated with the end node in accordance with the identifier-locator separation network protocol and a network token, determining whether the network token is valid, which includes determining whether the network token corresponds to the identifier associated with the end node without regard to the locator associated with the end node, and applying a network service associated with the network token to the network traffic in response to a determination that the network token is valid.

An embodiment is a set of non-transitory machine-readable media having computer code stored therein, which when executed by a set of one or more processors of one or more network devices implementing a network token verifier, causes the network token verifier to perform operations including receiving network traffic originated by an end node that implements an identifier-locator separation network protocol, wherein the network traffic includes an identifier and locator associated with the end node in accordance with the identifier-locator separation network protocol and a network token, determining whether the network token is valid, which includes determining whether the network token corresponds to the identifier associated with the end node without regard to the locator associated with the end node, and applying a network service associated with the network token to the network traffic in response to a determination that the network token is valid.

An embodiment is a network device to implement a network token verifier in a network. The network device includes one or more processors and a non-transitory machine-readable medium. The non-transitory machine-readable medium has computer code stored therein, which when executed by the one or more processors, causes the network token verifier to receive network traffic originated by an end node that implements an identifier-locator separation network protocol, wherein the network traffic includes an identifier and locator associated with the end node in accordance with the identifier-locator separation network protocol and a network token, determine whether the network token is valid, which includes determining whether the network token corresponds to the identifier associated with the end node without regard to the locator associated with the end node, and apply a network service associated with the network token to the network traffic in response to a determination that the network token is valid.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
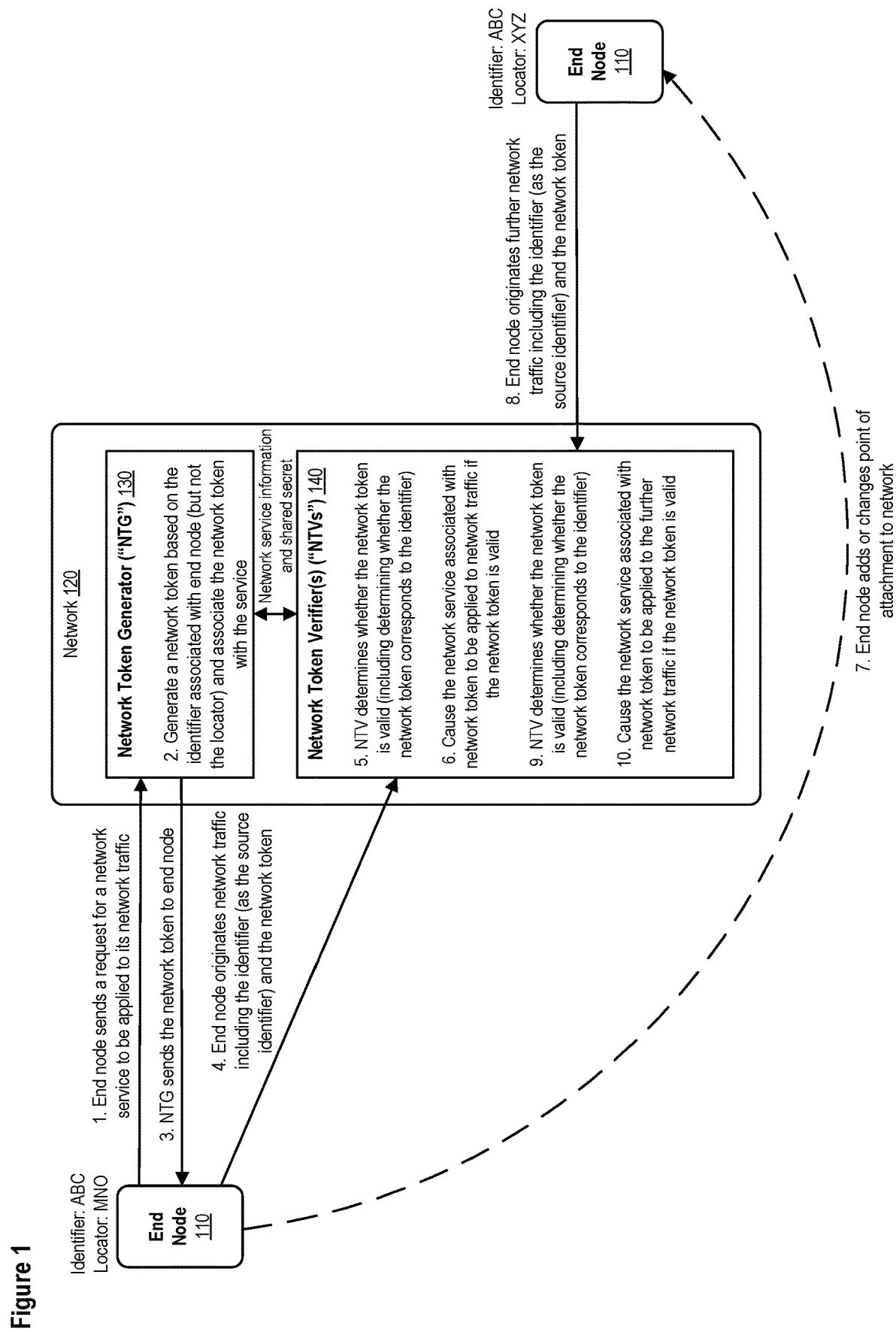
FIG. 1 shows an environment in which network services may be provided using network tokens, according to some embodiments.

The following description describes methods and apparatus for simplifying network service delivery using an identifier-locator separation network protocol and network tokens. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of various embodiments. It will be appreciated, however, by one skilled in the art that embodiments may be practiced without such specific details. In other instances, control structures, gate level circuits and full software instruction sequences have not been shown in detail in order not to obscure the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, network protocols have been proposed that create a separation between the identifier and the locator. Examples of such network protocols include Identifier/Locator Network Protocol (ILNP) and Locator/Identifier Separation Protocol (LISP).

ILNP separates an Internet Protocol version 6 (IPv6) address into a locator and an identifier. The locator uses the upper 64-bits of the 128-bit IPv6 address and the identifier uses the lower 64-bits of the 128-bit IPv6 address. In ILNP, a locator is a topologically bound name for an Internet Protocol (IP) subnetwork (and is used for forwarding packets based on locator prefixes distributed in the IP routing system) and an identifier is a non-topological name for identifying a node. Identifiers in ILNP may be flat routed within an administrative domain. A node may have multiple locators and multiple identifiers simultaneously. It should be noted that an IPv6 address names a specific network interface of a specific node but an ILNP identifier names the node itself instead of a specific interface of the node.

With the network token scheme mentioned above, an end node may obtain a network token and include the network token in packets that it originates. When a packet including the network token arrives at an entity of the network that is responsible for determining whether a network service is to be applied to the packet, the entity examines the network token. If the entity is able to confirm the validity of the network token (e.g., using cryptographic verification), the entity may apply the network service associated with the network token to the packet. In implementations where the network token is not included in every packet, the relevant entities in the network may store the network token state so as to be apple to apply the appropriate network service to all relevant packets.

In conventional network token schemes that do not use ILNP, packets are generally identified by a 5-tuple of IP source address, IP destination address, source port number, destination port number, and protocol name. Disadvantageously, this requires that the network perform 5-tuple inspection of every packet in order to match the packets to the network service, which can be computationally expensive and slow. It may even be impossible with some encapsulations of packets. Also, if the end node adds or changes its attachment point to the network (resulting in the end node being assigned a new IP address), the network token may no longer be valid. Supporting end node mobility with conventional network token schemes requires creating tunnels and possibly creating separate network tokens for different tunnels, which adds complexity.

Embodiments implement a network token scheme with an identifier-locator separation protocol to create a simpler solution that supports end node mobility. The network token is a form of attestation to the willingness of the network to forward network traffic from the end node presenting the network token and the treatment that the network traffic should receive. The network token scheme works even when the end node appears at arbitrary points in the network. This aligns well with the identifier-locator separation paradigm of client-controlled mobility without anchor points or control plane signaling.

According to some embodiments, an end node may send a request to a network token generator in a network to apply a network service to network traffic originated by the end node. The end node may generate a new identifier that is in accordance with an identifier-locator separation protocol (e.g., an ILNP identifier) that is to be used with the network service and include this identifier in the request (in other embodiments, the end node may request that the network token generator generate the identifier on behalf of the end node). The network token generator may generate a network token based on this new identifier but not based on the locator, associate the network token with the requested network service, and send the network token to the end node. In this way, the network token may be tied to the identifier (instead of the 5-tuple) and may serve as an attestation that the identifier can be used for the network service.

An advantage of tying the network token to the identifier (e.g., instead of the 5-tuple) is that it supports end node mobility while simplifying the state that is maintained in the network and simplifying the traffic processing requirements of the network. There is no need to create complex tunnels or create separate network tokens for different tunnels to support end node mobility. Also, the network token may be used to receive the associated network service regardless of the network interface (physical or virtual network interface) used. As such, embodiments naturally support multiple application flows without additional state in the network.

Tying the network token to the identifier may also provide additional advantages. For example, the network token may function as a charging key for usage-based services. Also, the network token may indicate that lawful intercept is required and be used to correlate captured information. This is in addition to the generalized property of providing an access control mechanism that works when the end node is controlling the artifacts of mobility.

Embodiments will now be described with reference to the accompanying figures.

FIG. 1 shows an environment in which network services may be provided using network tokens, according to some embodiments.

As shown in the figure, the environment includes an end node 110 and a network 120. The network 120 may be any type of communication network that end nodes can use to communicate with each other. In one embodiment, the network 120 is a mobile network such as a 3rd Generation Partnership Project (3GPP) 4th generation (4G) network or 5th generation (5G) network. The end node may be a physical or virtual end point that is able to communicate with other end nodes over the network 120. In an embodiment where the network 120 is a mobile network, the end node 110 may be a user equipment (UE). For sake of illustration, the figure shows a single end node connected to the network. It should be understood, however, that there can be (and typically will be) more than one end node connected to the network 120.

The end node 110 may implement an identifier-locator separation protocol such as ILNP or LISP. In this regard, the end node 110 may have an identifier and a locator in accordance with the identifier-locator separation protocol. The end node 110 may have multiple identifiers and/or multiple locators.

The end node 110 may send a request to a network token generator 130 in the network 120 to apply a network service to network traffic originated by the end node 110. The end node 110 may know how to reach the network token generator 130 based on the use of Dynamic Host Control Protocol (DHCP), configuration, as an artifact of registration with the network 120, or the use of a service discovery mechanism. The requested network service may include a level of quality of service to be applied to network traffic (e.g., latency bounds, latency variation bounds, and/or bandwidth requirements). In one embodiment, the end node 110 generates an identifier in accordance with an identifier-locator separation protocol that is to be used with the requested network service and includes it in the request. In another embodiment, the network token generator 130 generates an identifier on behalf of the end node 110. In yet another embodiment, the identifier used has been assigned by means outside the scope of this disclosure.

The network token generator 130 is a component of the network 120 that is configured to generate network tokens. When the network token generator 130 receives a request from an end node 110 to apply a network service to network traffic originated by the end node 110, the network token generator 130 may determine whether the request should be granted (this determination could be made based on multiple factors such as whether there are sufficient resources available in the network 120 to fulfill the request and whether there are business/financial reasons to grant the request). If the network token generator 130 determines that the request should be granted, the network token generator 130 may generate a network token based on the identifier associated with the end node but not based on a locator associated with the end node. As mentioned above, the identifier may have been generated by the end node 110 itself and included in the request (or otherwise provided to the network token generator 130) or generated by the network token generator 130 on behalf of the end node 110 (or assigned to the end node 110 using some other means). The network token generator 130 may generate the network token based on applying a cryptographic function to the identifier associated with the end node (but not the locator associated with the end node). In one embodiment, the network token generator 130 uses a shared secret as part of applying the cryptographic function. The network token generator 130 may then associate the generated network token with the requested network service. In one embodiment, this includes the network token generator 130 sending information about the network service and the shared secret to network token verifier(s) 140 in the network 120 to allow the network token verifier(s) 140 to verify the validity of the network token when they receive network traffic that includes the network token and to allow the network token verifier(s) to cause the network service to be applied to the network traffic if the network token is valid. The network token generator 130 may send the network token to the end node 110 so that the end node 110 can use the network token to receive the requested network service. The network token generator 130 may be implemented by one or more network devices. In one embodiment, the network token generator 130 is implemented in the cloud.

Once the end node 110 receives the network token, the end node 110 may include the network token in network traffic that it originates to request that the network apply the desired network service to that network traffic. The network traffic may thus include the identifier (as the source identifier for the network traffic) and the network token. In one embodiment (e.g., an embodiment where the end node implements ILNP), the identifier corresponds to the lower 64 bits of the Internet Protocol version 6 (IPv6) address associated with the end node and the locator associated with the end node corresponds to the upper 64 bits of the IPv6 address associated with the end node.

The network token verifier(s) 140 is a component of the network 120 that is configured to verify the validity of network tokens. When a network token verifier 140 receives network traffic that includes a network token, it may determine whether the network token is valid. In one embodiment, the network token verifier 140 uses the shared secret it received from the network token generator 130 to (cryptographically) verify the network token. In one embodiment, determining whether the network token is valid involves determining whether the network token corresponds to the identifier of the end node 110 that originated the network traffic without regard to the locator associated with the end node 110 (as well as verifying that the network token has not been forged (e.g., based on cryptography)). If the network token verifier 140 determines that the network token is valid (e.g., based on a determination that the network token corresponds to the identifier and the network token has not been forged), then the network token verifier 140 may determine the network service associated with the network token and cause the network service to be applied to the traffic. Otherwise, if the network token verifier 140 determines that that the network token is invalid, then the network token verifier 140 may decide that the network service should not be applied to the traffic. In one embodiment, the network token verifier 140 maintains state that associates the network service with the identifier. The network token verifier 140 may then apply the network service to one or more packets of the network traffic that do not include the network token in response to a determination based on the state that the network token applies to the one or more packets (e.g., because the one or more packets include the identifier as the source identifier). The network token verifier(s) 140 may be implemented by one or more network devices. In one embodiment, a network token verifier 140 is implemented as part of a router (or other type of network traffic forwarding device) in the network 120.

In one embodiment, the network token may be used for applying other types of functionality to the network traffic. For example, the network token verifier 140 may be used for applying access control, usage charging, and/or legal intercept to network traffic. Certain functionality such as those mentioned above may be applied to network traffic if the network traffic includes an identifier and a valid network token corresponding to the identifier, regardless of the attachment point through which the network traffic entered the network 120.

Example operations are shown in the figure and will now be described to further illustrate an embodiment.

At operation 1, the end node 110 sends a request for a network service to be applied to its network traffic to the network token generator 130. The end node 110 may be associated with an identifier and a locator in accordance with an identifier-locator separation protocol (e.g., an TLNP identifier and an ILNP locator). In one embodiment, the end node 110 generates a new identifier that is to be used with the network service and includes it in the request. In another embodiment, the network token generator 130 (or other component of the network 120) generates the identifier on behalf of the end node 110. In the example shown in the figure, the end node is associated with the identifier "ABC" and is associated with the locator "MNO."

At operation 2, the network token generator 130 generates a network token based on the identifier associated with the end node 110 ("ABC") but not the locator of the end node 110, and associates the network token with the network service (assuming that the network token generator 130 determines that the request should be granted). In one embodiment, the network token generator 130 sends information about the network service and a shared secret (e.g., that was used to cryptographically generate the network token) to the network token verifier(s) 140. At operation 3, the network token generator 130 sends the network token to the end node 110.

At operation 4, the end node 110 originates network traffic that includes the identifier associated with the end node ("ABC" is the source identifier of this network traffic) and the network token.

At operation 5, the network token verifier 140 determines whether the network token included in the network traffic is valid. This may include determining whether the network token corresponds to the identifier and determining whether the network token has been forged (e.g., using the shared secret). At operation 6, the network token verifier 140 determines the network service associated with the network token and causes the network service to be applied to the network traffic if the network token is determined to be valid.

At operation 7, the end node 110 adds or changes its point of attachment to the network 120 such that the locator of the end node 110 is "XYZ." It should be noted, however, that the identifier associated with the end node 110 remains the same even when the end node 110 adds or changes its point of attachment to the network 120 ("ABC" in this example).

At operation 8, the end node 110 originates further network traffic that includes the identifier associated with the end node ("ABC" is the source identifier of this network traffic) and the network token.

At operation 9, a network token verifier 140 (which may be the same or different network token verifier that verified the network token in operation 5) determines whether the network token included in the further network traffic is valid. This may include determining whether the network token corresponds to the identifier and determining whether the network token has been forged (e.g., using the shared secret). At operation 10, the network token verifier 140 determines the network service associated with the network token and causes the network service to be applied to the further network traffic if the network token is determined to be valid.

Embodiments may thus tie the network token to the identifier of an identifier-locator separation network protocol instead of the 5-tuple. An advantage of this approach is that it supports end node mobility while simplifying the state that is maintained in the network and simplifying the traffic processing requirements of the network. There is no need to create complex tunnels or create separate network tokens for different tunnels to support end node mobility. Also, the network token may be used to receive the network service regardless of the network interface (physical or virtual network interface) used. As such, embodiments naturally support multiple application flows without additional state in the network.

Figure 2:
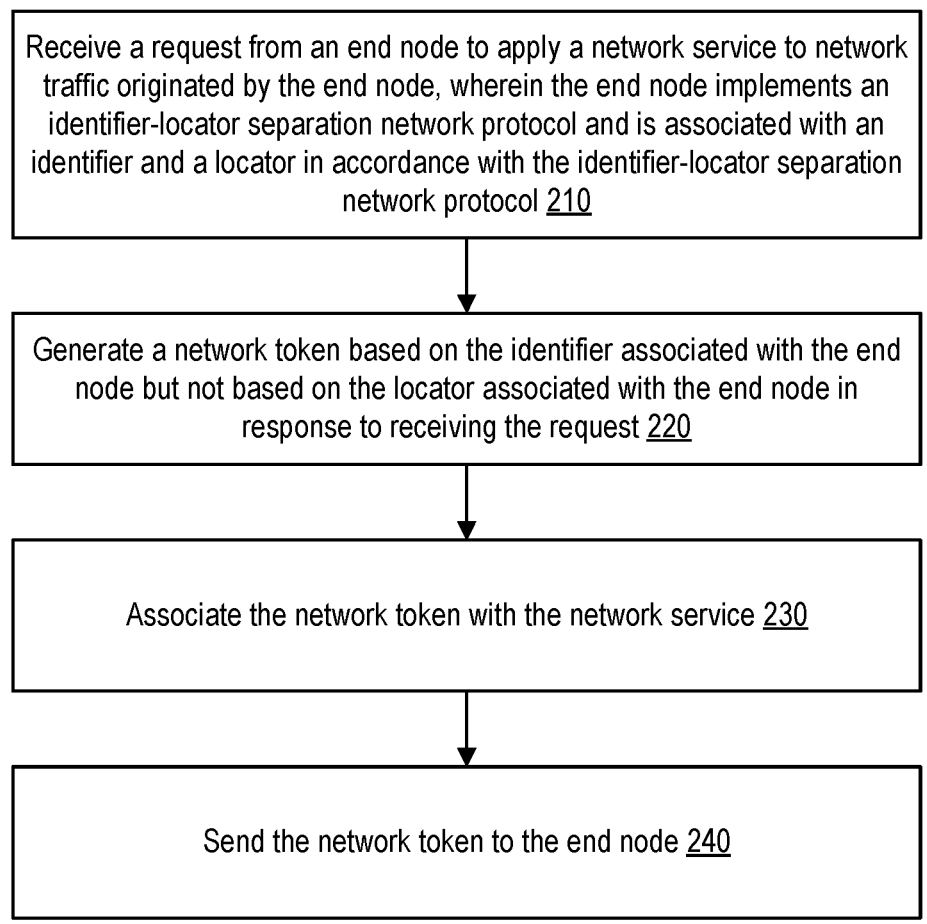
FIG. 2 shows a flow diagram of a method for generating a network token, according to some embodiments.

FIG. 2 shows a flow diagram of a method for generating a network token, according to some embodiments. The method may be implemented by a network token generator 130 in a network 120, where the network token generator 130 is implemented by one or more network devices.

The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

The method may be initiated at block 210 when the network token generator receives a request from an end node to apply a network service to network traffic originated by the end node, wherein the end node implements an identifier-locator separation network protocol and is associated with an identifier and a locator in accordance with the identifier-locator separation network protocol. In one embodiment, the identifier-locator separation network protocol is ILNP. In an embodiment where the identifier-locator separation network protocol is ILNP, the identifier associated with the end node may correspond to a lower 64 bits of an IPv6 address associated with the end node and the locator associated with the end node may correspond to an upper 64 bits of the IPv6 address associated with the end node. In one embodiment, the requested network service includes a level of quality of service to apply to network traffic. In one embodiment, the identifier associated with the end node is generated by the end node and included in the request.

At block 220, the network token generator generates a network token based on the identifier associated with the end node but not based on the locator associated with the end node in response to receiving the request (assuming the request is granted). In one embodiment, the network token is generated based on applying a cryptographic function to the identifier associated with the end node but not the locator associated with the end node.

At block 230, the network token generator associates the network token with the network service.

At block 240, the network token generator sends the network token to the end node.

Figure 3:
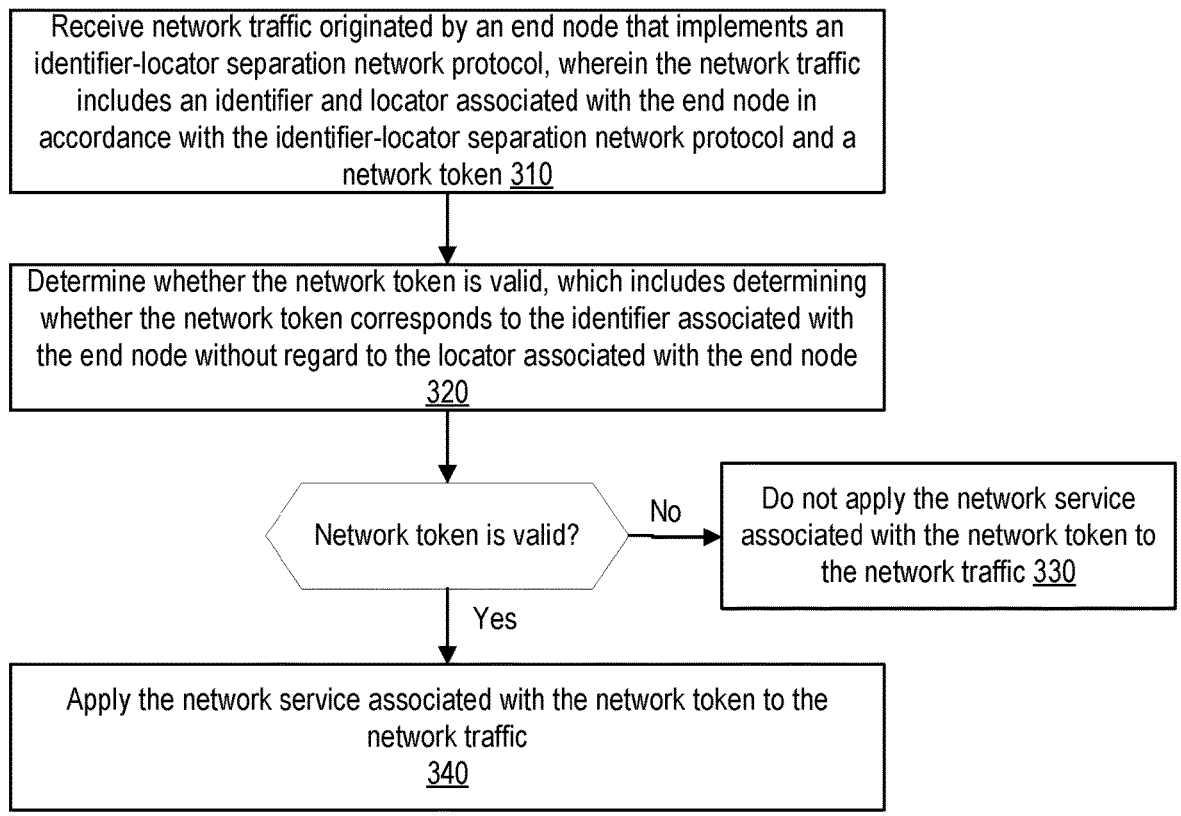
FIG. 3 shows a flow diagram of a method for verifying a network token, according to some embodiments.

FIG. 3 shows a flow diagram of a method for verifying a network token, according to some embodiments. The method may be implemented by a network token verifier 140 in a network 120, where the network token verifier 140 is implemented by one or more network devices.

The method may be initiated at block 310 when the network token verifier receives network traffic originated by an end node that implements an identifier-locator separation network protocol, wherein the network traffic includes an identifier and locator associated with the end node in accordance with the identifier-locator separation network protocol and a network token. In one embodiment, the identifier-locator separation network protocol is ILNP. In an embodiment where the identifier-locator separation network protocol is ILNP, the identifier associated with the end node may correspond to a lower 64 bits of an IPv6 address associated with the end node and the locator associated with the end node may correspond to an upper 64 bits of the IPv6 address associated with the end node. In one embodiment, the network token was generated (e.g., by a network token generator) based on applying a cryptographic function to the identifier associated with the end node but not the locator associated with the end node.

At block 320, the network token verifier determines whether the network token is valid, which includes determining whether the network token corresponds to the identifier associated with the end node without regard to the locator associated with the end node.

If the network token verifier determines that the network token is not valid, then at block 330, the network token verifier does not apply the network service associated with the network token to the network traffic. Otherwise, if the network token verifier determines that the network token is valid, then at block 340, the network token verifier applies the network service associated with the network token to the network traffic. In one embodiment, the network token verifier maintains state that associates the network service with the identifier, wherein the network service associated with the network token is applied to one or more packets of the network traffic that do not include the network token in response to a determination based on the state that the network token applies to the one or more packets.

In one embodiment, the network token verifier causes one or more of access control, usage charging, and legal intercept to be applied to the network traffic in response to a determination that the network traffic includes the identifier associated with the end node (as the source identifier) and the network token.

Figure 4:
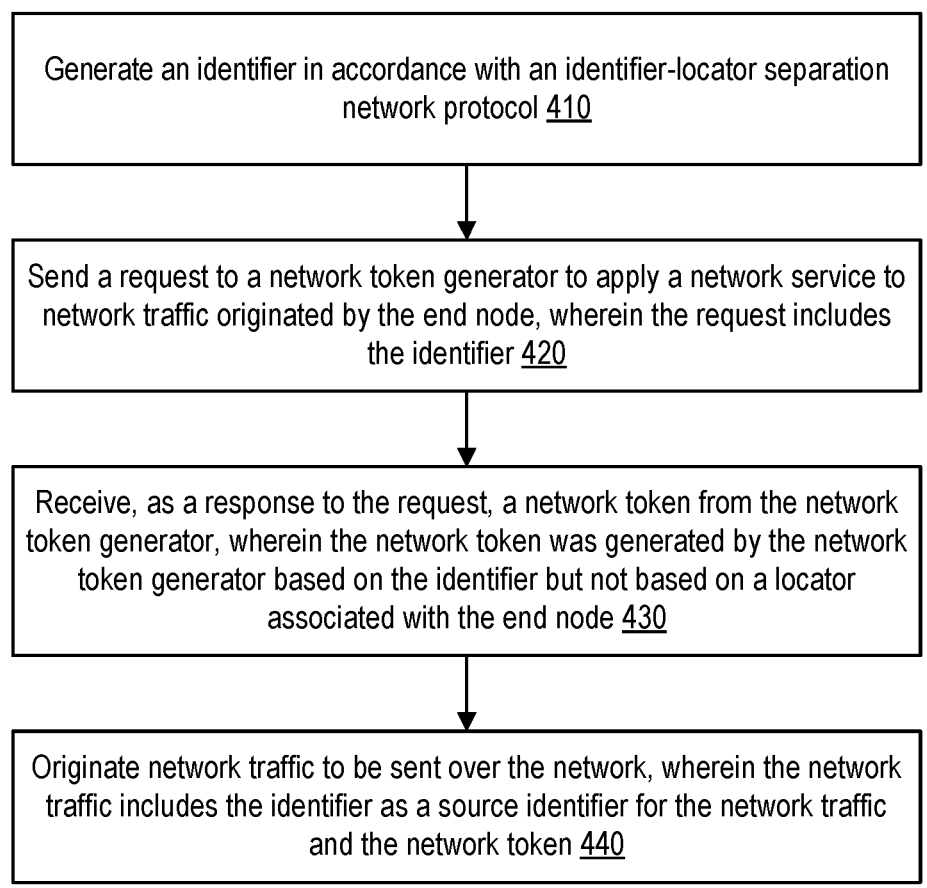
FIG. 4 shows a flow diagram of a method for requesting a network service to be applied to network traffic, according to some embodiments.

FIG. 4 shows a flow diagram of a method for requesting a network service to be applied to network traffic, according to some embodiments. The method may be implemented by an end node connected to a network, where the end node is implemented by one or more network devices.

At block 410, the end node generates an identifier in accordance with an identifier-locator separation network protocol. In one embodiment, the identifier-locator separation network protocol is ILNP.

At block 420, the end node sends a request to a network token generator to apply a network service to network traffic originated by the end node, wherein the request includes the identifier.

At block 430, the end node receives, as a response to the request, a network token from the network token generator, wherein the network token was generated by the network token generator based on the identifier but not based on a locator associated with the end node. In an embodiment where the identifier-locator separation network protocol is ILNP, the identifier associated with the end node may correspond to a lower 64 bits of an IPv6 address associated with the end node and the locator associated with the end node may correspond to an upper 64 bits of the IPv6 address associated with the end node.

At block 440, the end node originates network traffic to be sent over the network, wherein the network traffic includes the identifier as a source identifier for the network traffic and the network token.

Figure 5:
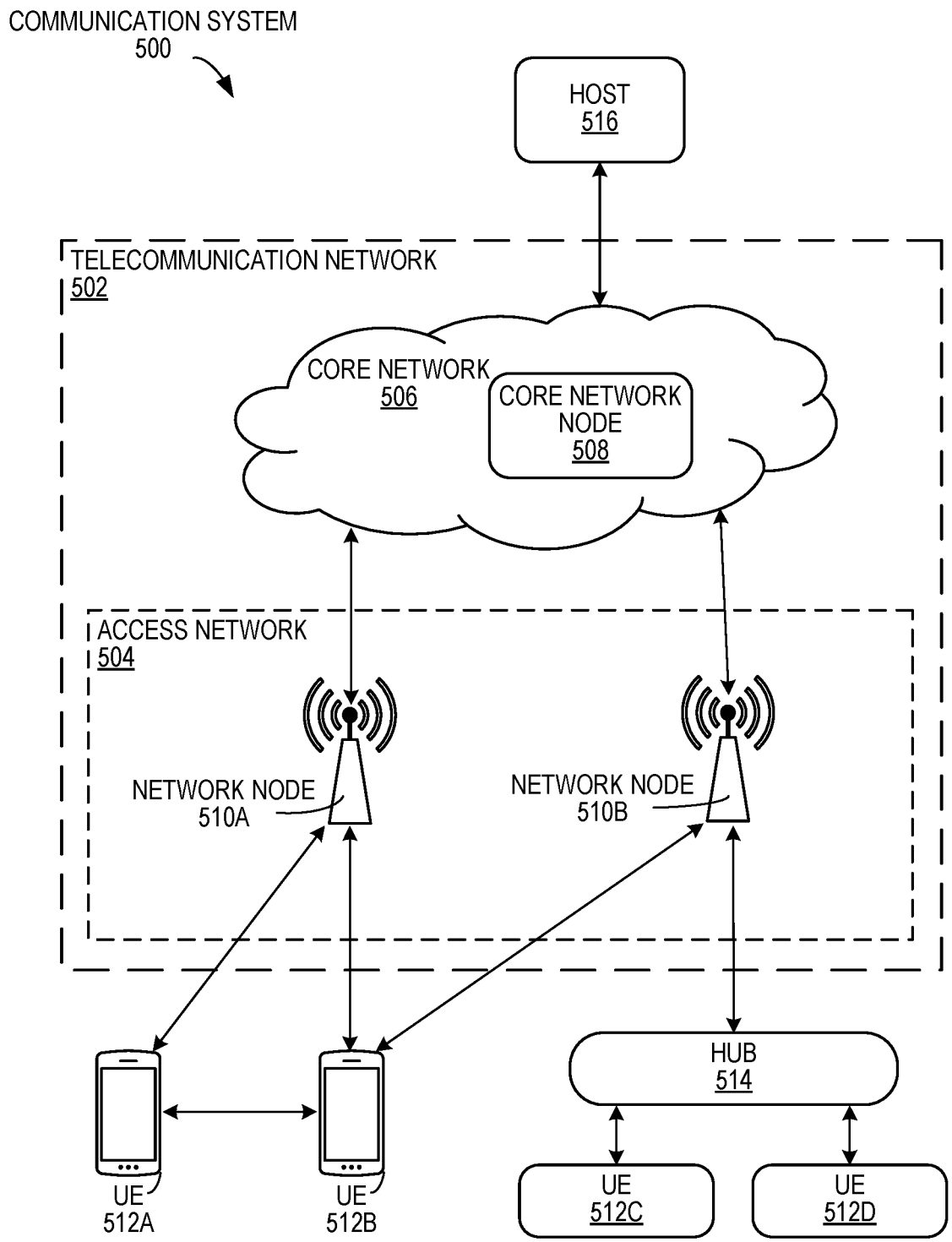
FIG. 5 shows an example of a communication system, according to some embodiments.

FIG. 5 shows an example of a communication system, according to some embodiments. In the example, the communication system 500 includes a telecommunication network 502 that includes an access network 504, such as a radio access network (RAN), and a core network 506, which includes one or more core network nodes 508. The access network 504 includes one or more access network nodes, such as network nodes 510a and 510b (one or more of which may be generally referred to as network nodes 510), or any other similar 3$^{rd}$ Generation Partnership Project (3GPP) access node or non-3GPP access point. The network nodes 510 facilitate direct or indirect connection of user equipment (UE), such as by connecting UEs 512a, 512b, 512c, and 512d (one or more of which may be generally referred to as UEs 512) to the core network 506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 500 may include any number of wired or wireless networks, network nodes, UEs, and/or any other components or systems that may facilitate or participate in the communication of data and/or signals whether via wired or wireless connections. The communication system 500 may include and/or interface with any type of communication, telecommunication, data, cellular, radio network, and/or other similar type of system.

The UEs 512 may be any of a wide variety of communication devices, including wireless devices arranged, configured, and/or operable to communicate wirelessly with the network nodes 510 and other communication devices. Similarly, the network nodes 510 are arranged, capable, configured, and/or operable to communicate directly or indirectly with the UEs 512 and/or with other network nodes or equipment in the telecommunication network 502 to enable and/or provide network access, such as wireless network access, and/or to perform other functions, such as administration in the telecommunication network 502.

In the depicted example, the core network 506 connects the network nodes 510 to one or more hosts, such as host 516. These connections may be direct or indirect via one or more intermediary networks or devices. In other examples, network nodes may be directly coupled to hosts. The core network 506 includes one more core network nodes (e.g., core network node 508) that are structured with hardware and software components. Features of these components may be substantially similar to those described with respect to the UEs, network nodes, and/or hosts, such that the descriptions thereof are generally applicable to the corresponding components of the core network node 508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF). In one embodiment, one or more core network nodes 508 implement a network token generator 130 and/or a network token verifier 140.

The host 516 may be under the ownership or control of a service provider other than an operator or provider of the access network 504 and/or the telecommunication network 502, and may be operated by the service provider or on behalf of the service provider. The host 516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 500 of FIG. 5 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 502 is a cellular network that implements 3GPP standardized features. Accordingly, the telecommunications network 502 may support network slicing to provide different logical networks to different devices that are connected to the telecommunication network 502. For example, the telecommunications network 502 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 512 are configured to transmit and/or receive information without direct human interaction. For instance, a UE may be designed to transmit information to the access network 504 on a predetermined schedule, when triggered by an internal or external event, or in response to requests from the access network 504. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 514 communicates with the access network 504 to facilitate indirect communication between one or more UEs (e.g., UE 512c and/or 512d) and network nodes (e.g., network node 510b). In some examples, the hub 514 may be a controller, router, content source and analytics, or any of the other communication devices described herein regarding UEs. For example, the hub 514 may be a broadband router enabling access to the core network 506 for the UEs. As another example, the hub 514 may be a controller that sends commands or instructions to one or more actuators in the UEs. Commands or instructions may be received from the UEs, network nodes 510, or by executable code, script, process, or other instructions in the hub 514. As another example, the hub 514 may be a data collector that acts as temporary storage for UE data and, in some embodiments, may perform analysis or other processing of the data. As another example, the hub 514 may be a content source. For example, for a UE that is a VR headset, display, loudspeaker or other media delivery device, the hub 514 may retrieve VR assets, video, audio, or other media or data related to sensory information via a network node, which the hub 514 then provides to the UE either directly, after performing local processing, and/or after adding additional local content. In still another example, the hub 514 acts as a proxy server or orchestrator for the UEs, in particular in if one or more of the UEs are low energy IoT devices.

The hub 514 may have a constant/persistent or intermittent connection to the network node 510b. The hub 514 may also allow for a different communication scheme and/or schedule between the hub 514 and UEs (e.g., UE 512c and/or 512d), and between the hub 514 and the core network 506. In other examples, the hub 514 is connected to the core network 506 and/or one or more UEs via a wired connection. Moreover, the hub 514 may be configured to connect to an M2M service provider over the access network 504 and/or to another UE over a direct connection. In some scenarios, UEs may establish a wireless connection with the network nodes 510 while still connected via the hub 514 via a wired or wireless connection. In some embodiments, the hub 514 may be a dedicated hub—that is, a hub whose primary function is to route communications to/from the UEs from/to the network node 510b. In other embodiments, the hub 514 may be a non-dedicated hub—that is, a device which is capable of operating to route communications between the UEs and network node 510b, but which is additionally capable of operating as a communication start and/or end point for certain data channels.

Figure 6:
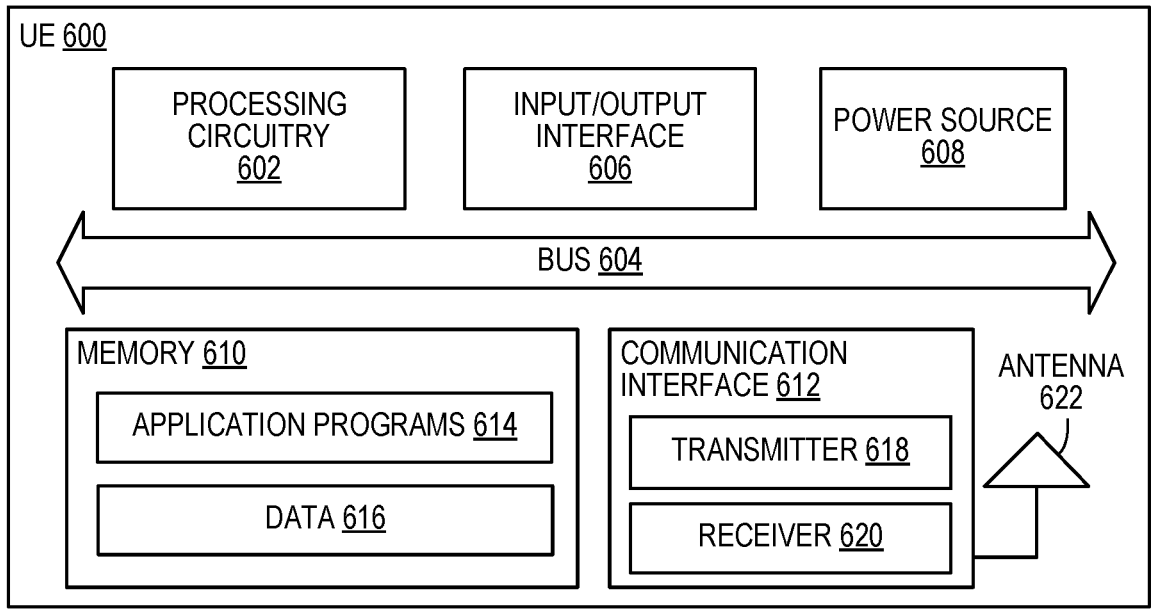
FIG. 6 shows a user equipment (UE), according to some embodiments.

FIG. 6 shows a UE, according to some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 600 includes processing circuitry 602 that is operatively coupled via a bus 604 to an input/output interface 606, a power source 608, a memory 610, a communication interface 612, and/or any other component, or any combination thereof. Certain UEs may utilize all or a subset of the components shown in FIG. 6. The level of integration between the components may vary from one UE to another UE. Further, certain UEs may contain multiple instances of a component, such as multiple processors, memories, transceivers, transmitters, receivers, etc.

The processing circuitry 602 is configured to process instructions and data and may be configured to implement any sequential state machine operative to execute instructions stored as machine-readable computer programs in the memory 610. The processing circuitry 602 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 602 may include multiple central processing units (CPUs).

In the example, the input/output interface 606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 608 is structured as a battery or battery pack. Other types of power sources, such as an external power source (e.g., an electricity outlet), photovoltaic device, or power cell, may be used. The power source 608 may further include power circuitry for delivering power from the power source 608 itself, and/or an external power source, to the various parts of the UE 600 via input circuitry or an interface such as an electrical power cable. Delivering power may be, for example, for charging of the power source 608. Power circuitry may perform any formatting, converting, or other modification to the power from the power source 608 to make the power suitable for the respective components of the UE 600 to which power is supplied.

The memory 610 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 610 includes one or more application programs 614, such as an operating system, web browser application, a widget, gadget engine, or other application, and corresponding data 616. The memory 610 may store, for use by the UE 600, any of a variety of various operating systems or combinations of operating systems.

The memory 610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 610 may allow the UE 600 to access instructions, application programs and the like, stored on transitory or non-transitory memory media, to off-load data, or to upload data. An article of manufacture, such as one utilizing a communication system may be tangibly embodied as or in the memory 610, which may be or comprise a device-readable storage medium.

The processing circuitry 602 may be configured to communicate with an access network or other network using the communication interface 612. The communication interface 612 may comprise one or more communication subsystems and may include or be communicatively coupled to an antenna 622. The communication interface 612 may include one or more transceivers used to communicate, such as by communicating with one or more remote transceivers of another device capable of wireless communication (e.g., another UE or a network node in an access network). Each transceiver may include a transmitter 618 and/or a receiver 620 appropriate to provide network communications (e.g., optical, electrical, frequency allocations, and so forth). Moreover, the transmitter 618 and receiver 620 may be coupled to one or more antennas (e.g., antenna 622) and may share circuit components, software or firmware, or alternatively be implemented separately.

In the illustrated embodiment, communication functions of the communication interface 612 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 600 shown in FIG. 6.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

As mentioned above, in one embodiment, end node 110 is a UE.

Figure 7:
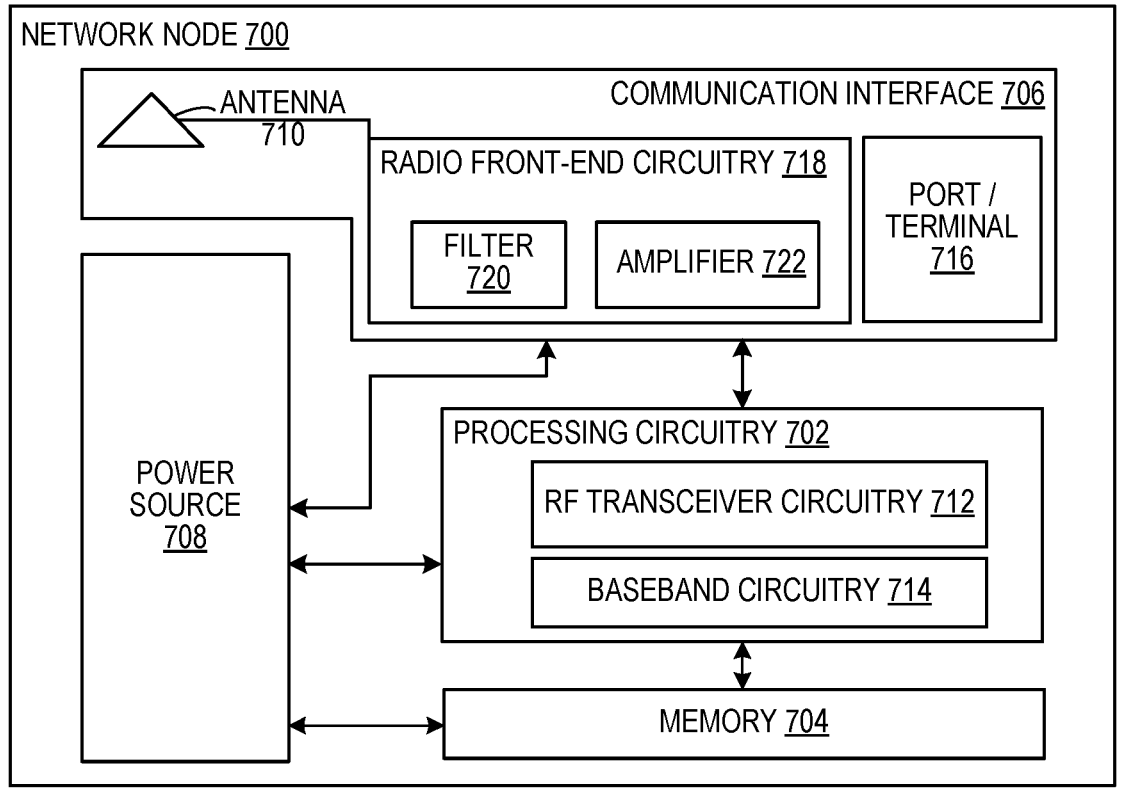
FIG. 7 shows a network node, according to some embodiments.

FIG. 7 shows a network node, according to some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 700 includes a processing circuitry 702, a memory 704, a communication interface 706, and a power source 708. The network node 700 may be composed of multiple physically separate components (e.g., a NodeB component and a RNC component, or a BTS component and a BSC component, etc.), which may each have their own respective components. In certain scenarios in which the network node 700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 700 may be configured to support multiple radio access technologies (RATs). In such embodiments, some components may be duplicated (e.g., separate memory 704 for different RATs) and some components may be reused (e.g., a same antenna 710 may be shared by different RATs). The network node 700 may also include multiple sets of the various illustrated components for different wireless technologies integrated into network node 700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 700.

The processing circuitry 702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 700 components, such as the memory 704, to provide network node 700 functionality.

In some embodiments, the processing circuitry 702 includes a system on a chip (SOC). In some embodiments, the processing circuitry 702 includes one or more of radio frequency (RF) transceiver circuitry 712 and baseband processing circuitry 714. In some embodiments, the radio frequency (RF) transceiver circuitry 712 and the baseband processing circuitry 714 may be on separate chips (or sets of chips), boards, or units, such as radio units and digital units. In alternative embodiments, part or all of RF transceiver circuitry 712 and baseband processing circuitry 714 may be on the same chip or set of chips, boards, or units.

The memory 704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 702. The memory 704 may store any suitable instructions, data, or information, including a computer program, software, an application including one or more of logic, rules, code, tables, and/or other instructions capable of being executed by the processing circuitry 702 and utilized by the network node 700. The memory 704 may be used to store any calculations made by the processing circuitry 702 and/or any data received via the communication interface 706. In some embodiments, the processing circuitry 702 and memory 704 is integrated.

The communication interface 706 is used in wired or wireless communication of signaling and/or data between a network node, access network, and/or UE. As illustrated, the communication interface 706 comprises port(s)/terminal(s) 716 to send and receive data, for example to and from a network over a wired connection. The communication interface 706 also includes radio front-end circuitry 718 that may be coupled to, or in certain embodiments a part of, the antenna 710. Radio front-end circuitry 718 comprises filters 720 and amplifiers 722. The radio front-end circuitry 718 may be connected to an antenna 710 and processing circuitry 702. The radio front-end circuitry may be configured to condition signals communicated between antenna 710 and processing circuitry 702. The radio front-end circuitry 718 may receive digital data that is to be sent out to other network nodes or UEs via a wireless connection. The radio front-end circuitry 718 may convert the digital data into a radio signal having the appropriate channel and bandwidth parameters using a combination of filters 720 and/or amplifiers 722. The radio signal may then be transmitted via the antenna 710. Similarly, when receiving data, the antenna 710 may collect radio signals which are then converted into digital data by the radio front-end circuitry 718. The digital data may be passed to the processing circuitry 702. In other embodiments, the communication interface may comprise different components and/or different combinations of components.

In certain alternative embodiments, the network node 700 does not include separate radio front-end circuitry 718, instead, the processing circuitry 702 includes radio front-end circuitry and is connected to the antenna 710. Similarly, in some embodiments, all or some of the RF transceiver circuitry 712 is part of the communication interface 706. In still other embodiments, the communication interface 706 includes one or more ports or terminals 716, the radio front-end circuitry 718, and the RF transceiver circuitry 712, as part of a radio unit (not shown), and the communication interface 706 communicates with the baseband processing circuitry 714, which is part of a digital unit (not shown).

The antenna 710 may include one or more antennas, or antenna arrays, configured to send and/or receive wireless signals. The antenna 710 may be coupled to the radio front-end circuitry 718 and may be any type of antenna capable of transmitting and receiving data and/or signals wirelessly. In certain embodiments, the antenna 710 is separate from the network node 700 and connectable to the network node 700 through an interface or port.

The antenna 710, communication interface 706, and/or the processing circuitry 702 may be configured to perform any receiving operations and/or certain obtaining operations described herein as being performed by the network node. Any information, data and/or signals may be received from a UE, another network node and/or any other network equipment. Similarly, the antenna 710, the communication interface 706, and/or the processing circuitry 702 may be configured to perform any transmitting operations described herein as being performed by the network node. Any information, data and/or signals may be transmitted to a UE, another network node and/or any other network equipment.

The power source 708 provides power to the various components of network node 700 in a form suitable for the respective components (e.g., at a voltage and current level needed for each respective component). The power source 708 may further comprise, or be coupled to, power management circuitry to supply the components of the network node 700 with power for performing the functionality described herein. For example, the network node 700 may be connectable to an external power source (e.g., the power grid, an electricity outlet) via an input circuitry or interface such as an electrical cable, whereby the external power source supplies power to power circuitry of the power source 708. As a further example, the power source 708 may comprise a source of power in the form of a battery or battery pack which is connected to, or integrated in, power circuitry. The battery may provide backup power should the external power source fail.

Embodiments of the network node 700 may include additional components beyond those shown in FIG. 7 for providing certain aspects of the network node's functionality, including any of the functionality described herein and/or any functionality necessary to support the subject matter described herein. For example, the network node 700 may include user interface equipment to allow input of information into the network node 700 and to allow output of information from the network node 700. This may allow a user to perform diagnostic, maintenance, repair, and other administrative functions for the network node 700.

Figure 8:
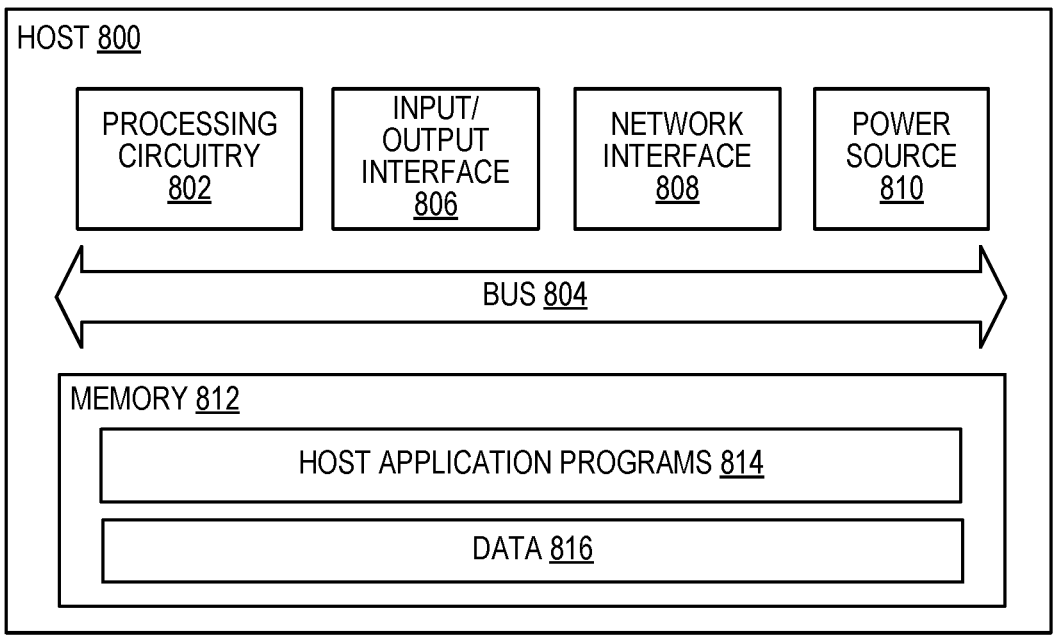
FIG. 8 shows a host, according to some embodiments.

FIG. 8 is a block diagram of a host (which may be an embodiment of the host 516 of FIG. 5), according to some embodiments. As used herein, the host 800 may be or comprise various combinations hardware and/or software, including a standalone server, a blade server, a cloud-implemented server, a distributed server, a virtual machine, container, or processing resources in a server farm. The host 800 may provide one or more services to one or more UEs.

The host 800 includes processing circuitry 802 that is operatively coupled via a bus 804 to an input/output interface 806, a network interface 808, a power source 810, and a memory 812. Other components may be included in other embodiments. Features of these components may be substantially similar to those described with respect to the devices of previous figures, such as FIGS. 6 and 7, such that the descriptions thereof are generally applicable to the corresponding components of host 800.

The memory 812 may include one or more computer programs including one or more host application programs 814 and data 816, which may include user data, e.g., data generated by a UE for the host 800 or data generated by the host 800 for a UE. Embodiments of the host 800 may utilize only a subset or all of the components shown. The host application programs 814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 814 may also provide for user authentication and licensing checks and may periodically report health, routes, and content availability to a central node, such as a device in or on the edge of a core network. Accordingly, the host 800 may select and/or indicate a different host for over-the-top services for a UE. The host application programs 814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 9:
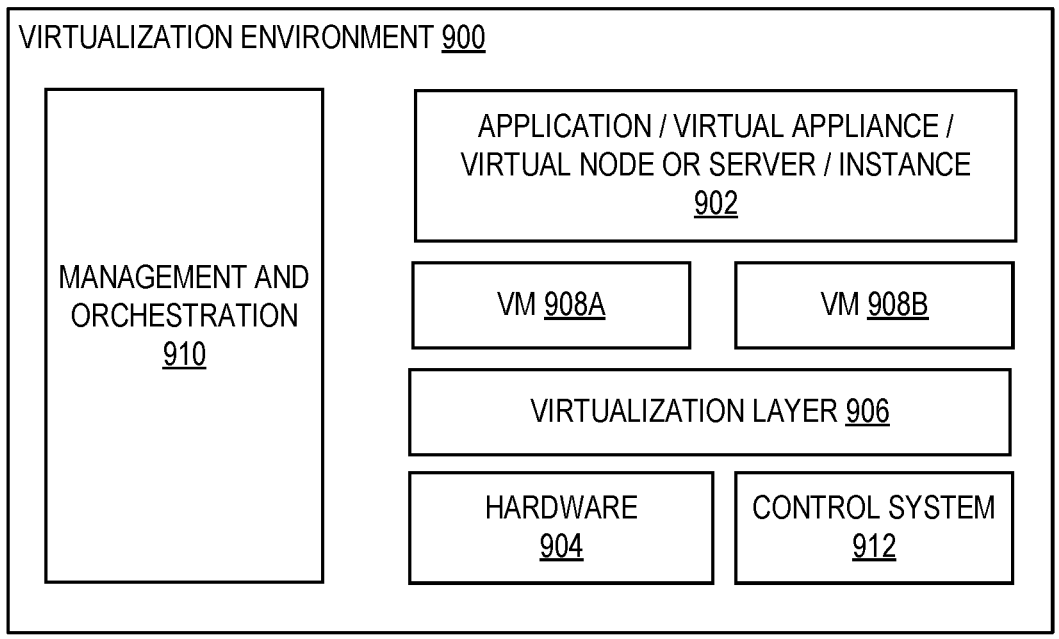
FIG. 9 shows a virtualization environment in which functions may be virtualized, according to some embodiments.

FIG. 9 is a block diagram illustrating a virtualization environment (in which functions implemented by some embodiments may be virtualized), according to some embodiments. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 904 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 906 (also referred to as hypervisors or virtual machine monitors (VMMs)), provide VMs 908a and 908b (one or more of which may be generally referred to as VMs 908), and/or perform any of the functions, features and/or benefits described in relation with some embodiments described herein. The virtualization layer 906 may present a virtual operating platform that appears like networking hardware to the VMs 908.

The VMs 908 comprise virtual processing, virtual memory, virtual networking or interface and virtual storage, and may be run by a corresponding virtualization layer 906. Different embodiments of the instance of a virtual appliance 902 may be implemented on one or more of VMs 908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 908 may be a software implementation of a physical machine that runs programs as if they were executing on a physical, non-virtualized machine. Each of the VMs 908, and that part of hardware 904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 908 on top of the hardware 904 and corresponds to the application 902.

Hardware 904 may be implemented in a standalone network node with generic or specific components. Hardware 904 may implement some functions via virtualization. Alternatively, hardware 904 may be part of a larger cluster of hardware (e.g. such as in a data center or CPE) where many hardware nodes work together and are managed via management and orchestration 910, which, among others, oversees lifecycle management of applications 902. In some embodiments, hardware 904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 912 which may alternatively be used for communication between hardware nodes and radio units.

Figure 10:
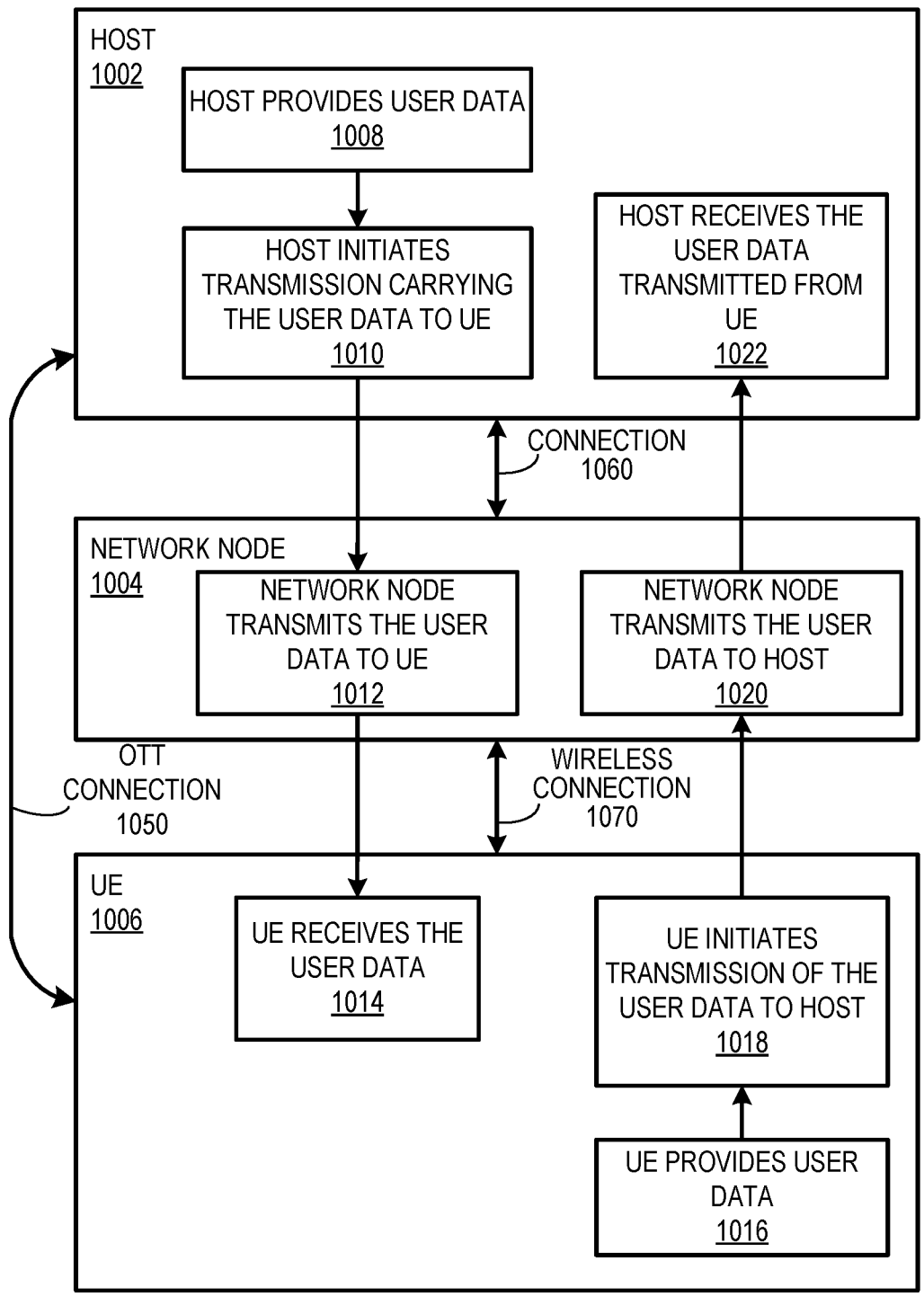
FIG. 10 shows a communication diagram of a host communicating via a network node with a UE over a partially wireless connection, according to some embodiments.

FIG. 10 shows a communication diagram of a host communicating via a network node with a UE over a partially wireless connection, according to some embodiments. Example implementations, in accordance with various embodiments, of the UE (such as a UE 512a of FIG. 5 and/or UE 600 of FIG. 6), network node (such as network node 510a of FIG. 5 and/or network node 700 of FIG. 7), and host (such as host 516 of FIG. 5 and/or host 800 of FIG. 8) discussed in the preceding paragraphs will now be described with reference to FIG. 10.

Like host 800, embodiments of host 1002 include hardware, such as a communication interface, processing circuitry, and memory. The host 1002 also includes software, which is stored in or accessible by the host 1002 and executable by the processing circuitry. The software includes a host application that may be operable to provide a service to a remote user, such as the UE 1006 connecting via an over-the-top (OTT) connection 1050 extending between the UE 1006 and host 1002. In providing the service to the remote user, a host application may provide user data which is transmitted using the OTT connection 1050.

The network node 1004 includes hardware enabling it to communicate with the host 1002 and UE 1006. The connection 1060 may be direct or pass through a core network (like core network 506 of FIG. 5) and/or one or more other intermediate networks, such as one or more public, private, or hosted networks. For example, an intermediate network may be a backbone network or the Internet.

The UE 1006 includes hardware and software, which is stored in or accessible by UE 1006 and executable by the UE's processing circuitry. The software includes a client application, such as a web browser or operator-specific "app" that may be operable to provide a service to a human or non-human user via UE 1006 with the support of the host 1002. In the host 1002, an executing host application may communicate with the executing client application via the OTT connection 1050 terminating at the UE 1006 and host 1002. In providing the service to the user, the UE's client application may receive request data from the host's host application and provide user data in response to the request data. The OTT connection 1050 may transfer both the request data and the user data. The UE's client application may interact with the user to generate the user data that it provides to the host application through the OTT connection 1050.

The OTT connection 1050 may extend via a connection 1060 between the host 1002 and the network node 1004 and via a wireless connection 1070 between the network node 1004 and the UE 1006 to provide the connection between the host 1002 and the UE 1006. The connection 1060 and wireless connection 1070, over which the OTT connection 1050 may be provided, have been drawn abstractly to illustrate the communication between the host 1002 and the UE 1006 via the network node 1004, without explicit reference to any intermediary devices and the precise routing of messages via these devices.

As an example of transmitting data via the OTT connection 1050, in step 1008, the host 1002 provides user data, which may be performed by executing a host application. In some embodiments, the user data is associated with a particular human user interacting with the UE 1006. In other embodiments, the user data is associated with a UE 1006 that shares data with the host 1002 without explicit human interaction. In step 1010, the host 1002 initiates a transmission carrying the user data towards the UE 1006. The host 1002 may initiate the transmission responsive to a request transmitted by the UE 1006. The request may be caused by human interaction with the UE 1006 or by operation of the client application executing on the UE 1006. The transmission may pass via the network node 1004, in accordance with the teachings of the embodiments described throughout this disclosure. Accordingly, in step 1012, the network node 1004 transmits to the UE 1006 the user data that was carried in the transmission that the host 1002 initiated, in accordance with the teachings of the embodiments described throughout this disclosure. In step 1014, the UE 1006 receives the user data carried in the transmission, which may be performed by a client application executed on the UE 1006 associated with the host application executed by the host 1002.

In some examples, the UE 1006 executes a client application which provides user data to the host 1002. The user data may be provided in reaction or response to the data received from the host 1002. Accordingly, in step 1016, the UE 1006 may provide user data, which may be performed by executing the client application. In providing the user data, the client application may further consider user input received from the user via an input/output interface of the UE 1006. Regardless of the specific manner in which the user data was provided, the UE 1006 initiates, in step 1018, transmission of the user data towards the host 1002 via the network node 1004. In step 1020, in accordance with the teachings of the embodiments described throughout this disclosure, the network node 1004 receives user data from the UE 1006 and initiates transmission of the received user data towards the host 1002. In step 1022, the host 1002 receives the user data carried in the transmission initiated by the UE 1006.

In an example scenario, factory status information may be collected and analyzed by the host 1002. As another example, the host 1002 may process audio and video data which may have been retrieved from a UE for use in creating maps. As another example, the host 1002 may collect and analyze real-time data to assist in controlling vehicle congestion (e.g., controlling traffic lights). As another example, the host 1002 may store surveillance video uploaded by a UE. As another example, the host 1002 may store or control access to media content such as video, audio, VR or AR which it can broadcast, multicast or unicast to UEs. As other examples, the host 1002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1050 between the host 1002 and UE 1006, in response to variations in the measurement results. The measurement procedure and/or the network functionality for reconfiguring the OTT connection may be implemented in software and hardware of the host 1002 and/or UE 1006. In some embodiments, sensors (not shown) may be deployed in or in association with other devices through which the OTT connection 1050 passes; the sensors may participate in the measurement procedure by supplying values of the monitored quantities exemplified above, or supplying values of other physical quantities from which software may compute or estimate the monitored quantities. The reconfiguring of the OTT connection 1050 may include message format, retransmission settings, preferred routing etc.; the reconfiguring need not directly alter the operation of the network node 1004. Such procedures and functionalities may be known and practiced in the art. In certain embodiments, measurements may involve proprietary UE signaling that facilitates measurements of throughput, propagation times, latency and the like, by the host 1002. The measurements may be implemented in that software causes messages to be transmitted, in particular empty or 'dummy' messages, using the OTT connection 1050 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

While several embodiments have been described, those skilled in the art will recognize that techniques and principles can be practiced with modification and alteration within the spirit and scope of the appended claims. The description is thus to be regarded as illustrative instead of limiting.

We claim:

1. A method by one or more network devices implementing a network token generator in a network, the method comprising:
   receiving a request from an end node to apply a network service to network traffic originated by the end node, wherein the end node implements an identifier-locator separation network protocol and is associated with an identifier and a locator in accordance with the identifier-locator separation network protocol;
   generating a network token based on the identifier associated with the end node but not based on the locator associated with the end node in response to receiving the request, wherein the network token is generated based on applying a cryptographic function to the identifier associated with the end node but not the locator associated with the end node;
   associating the network token with the network service; and
   sending the network token to the end node.

2. The method of claim 1, wherein the identifier-locator separation network protocol is Identifier/Locator Network Protocol (ILNP).

3. The method of claim 2, wherein the identifier associated with the end node corresponds to a lower 64 bits of an Internet Protocol version 6 (IPv6) address associated with the end node and the locator associated with the end node corresponds to an upper 64 bits of the IPv6 address associated with the end node.

4. The method of claim 1, wherein the network service includes a level of quality of service to apply to network traffic.

5. The method of claim 1, wherein the identifier associated with the end node is generated by the end node and included in the request.

6. A method by one or more network devices implementing a network token verifier in a network, the method comprising:
   receiving network traffic originated by an end node that implements an identifier-locator separation network protocol, wherein the network traffic includes an identifier and locator associated with the end node in accordance with the identifier-locator separation network protocol and a network token, wherein the network token was generated based on applying a cryptographic function to the identifier associated with the end node but not the locator associated with the end node;
   determining whether the network token is valid, which includes determining whether the network token corresponds to the identifier associated with the end node without regard to the locator associated with the end node; and
   applying a network service associated with the network token to the network traffic in response to a determination that the network token is valid.

7. The method of claim 6, wherein the identifier-locator separation network protocol is Identifier/Locator Network Protocol (ILNP).

8. The method of claim 7, wherein the identifier associated with the end node corresponds to a lower 64 bits of an Internet Protocol version 6 (IPv6) address associated with the end node and the locator associated with the end node corresponds to an upper 64 bits of the IPv6 address associated with the end node.

9. The method of claim 7, further comprising:
maintaining state that associates the network service with the identifier, wherein the network service associated with the network token is applied to one or more packets of the network traffic that do not include the network token in response to a determination based on the state that the network token applies to the one or more packets.

10. The method of claim 6, further comprising:
causing one or more of access control, usage charging, and legal intercept to be applied to the network traffic in response to a determination that the network traffic includes the identifier associated with the end node and the network token.

11. A set of non-transitory machine-readable media having computer code stored therein, which when executed by a set of one or more processors of one or more network devices implementing a network token generator, causes the network token generator to perform operations comprising:
receiving a request from an end node to apply a network service to network traffic originated by the end node, wherein the end node implements an identifier-locator separation network protocol and is associated with an identifier and a locator in accordance with the identifier-locator separation network protocol;
generating a network token based on the identifier associated with the end node but not based on the locator associated with the end node in response to receiving the request, wherein the network token is generated based on applying a cryptographic function to the identifier associated with the end node but not the locator associated with the end node;
associating the network token with the network service; and
sending the network token to the end node.

12. The set of non-transitory machine-readable media of claim 11, wherein the identifier-locator separation network protocol is Identifier/Locator Network Protocol (ILNP).

13. The set of non-transitory machine-readable media of claim 12, wherein the identifier associated with the end node corresponds to a lower 64 bits of an Internet Protocol version 6 (IPv6) address associated with the end node and the locator associated with the end node corresponds to an upper 64 bits of the IPV6 address associated with the end node.

14. The set of non-transitory machine-readable media of claim 11, wherein the network service includes a level of quality of service to apply to network traffic.

15. The set of non-transitory machine-readable media of claim 11, wherein the identifier associated with the end node is generated by the end node and included in the request.

16. A network device to implement a network token generator in a network, the network device comprising:
one or more processors; and
a non-transitory machine-readable medium having computer code stored therein, which when executed by the one or more processors, causes the network token generator to:
receive a request from an end node to apply a network service to network traffic originated by the end node, wherein the end node implements an identifier-locator separation network protocol and is associated with an identifier and a locator in accordance with the identifier-locator separation network protocol,
generate a network token based on the identifier associated with the end node but not based on the locator associated with the end node in response to receiving the request; wherein the network token is generated based on applying a cryptographic function to the identifier associated with the end node but not the locator associated with the end node;
associate the network token with the network service, and
send the network token to the end node.

17. The network device of claim 16, wherein the identifier-locator separation network protocol is Identifier/Locator Network Protocol (ILNP).

* * * * *